United States Patent [19]

Tommeraas

[11] 4,003,594
[45] Jan. 18, 1977

[54] HYDRAULIC SHOCK ABSORBING BUMPER MOUNTING ARRANGEMENT

[76] Inventor: Nils Christian Tommeraas, Lunders vei 16, 2830 Raufoss, Norway

[22] Filed: Mar. 7, 1975

[21] Appl. No.: 556,386

[30] Foreign Application Priority Data

Mar. 7, 1974 Norway .............................. 800/74

[52] U.S. Cl. ................................. 293/84; 267/116; 267/139; 293/89; 293/99
[51] Int. Cl.² ................. B60R 19/06; B60R 21/14; B60R 27/00; B61F 19/04
[58] Field of Search ................... 293/84, 73, 75, 84, 293/88, 89, 99; 267/116, 139; 137/493.5; 254/8

[56] References Cited

UNITED STATES PATENTS

| 1,512,797 | 10/1924 | Pryor | 293/84 |
|---|---|---|---|
| 1,777,342 | 10/1930 | Williams | 293/84 |
| 2,596,982 | 5/1952 | Chisholm, Jr. | 137/493.5 |
| 2,640,693 | 6/1953 | Magrum | 254/8 |
| 3,751,089 | 8/1973 | Lefeuvre | 293/73 X |
| 3,771,824 | 11/1973 | Applegate | 293/84 |
| 3,774,950 | 11/1973 | Weller | 293/88 X |
| 3,820,834 | 6/1974 | Wilfert et al. | 293/75 |
| 3,823,968 | 7/1974 | Barenyi | 293/84 |

FOREIGN PATENTS OR APPLICATIONS

| 1,933,852 | 7/1969 | Germany | 293/84 |

*Primary Examiner*—Robert J. Spar
*Assistant Examiner*—Howard Beltran
*Attorney, Agent, or Firm*—Hill, Gross, Simpson, Van Santen, Steadman, Chiara & Simpson

[57] ABSTRACT

A device to provide cushioned elasticity in a vehicle bumper mounting arrangement, highly desirable for use on vehicles such as private automobiles, delivery vans, etc. The device comprises an apparatus utilizing hydraulic shock absorbers of the telescopic type, preferably spring biased, and arranged to absorb at least a material portion of the energy provided by impact, the spring biasing returning the bumper to its normal position following an impact. The apparatus is particularly suitable for uses in cases where there is extremely little space available between the vehicle and the bumper, most of the apparatus being mounted within a channeled type bumper.

9 Claims, 7 Drawing Figures

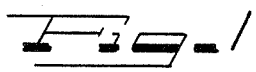
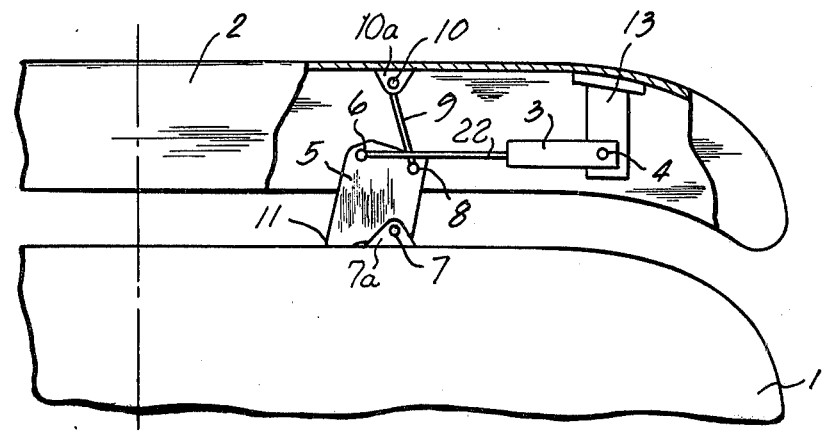
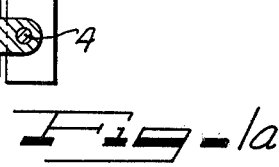
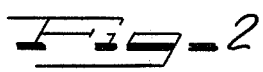
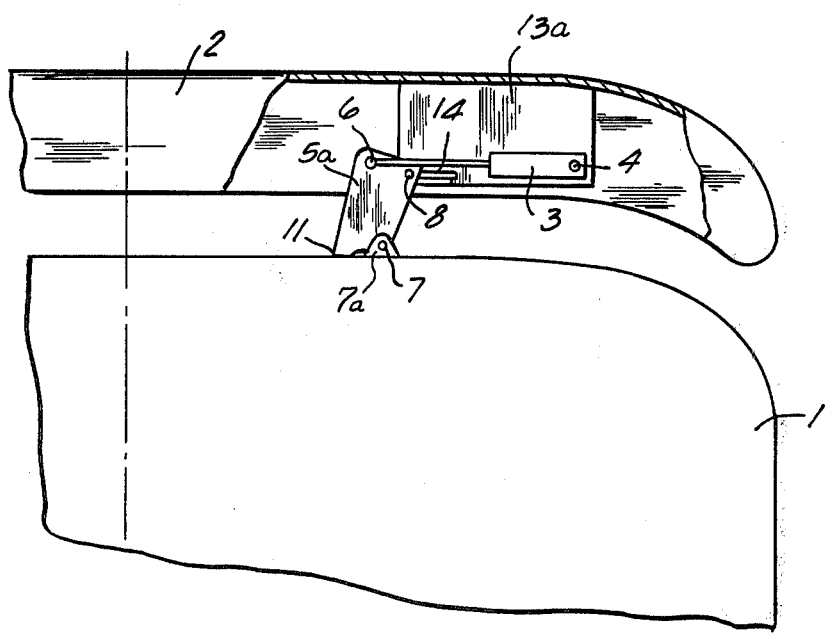

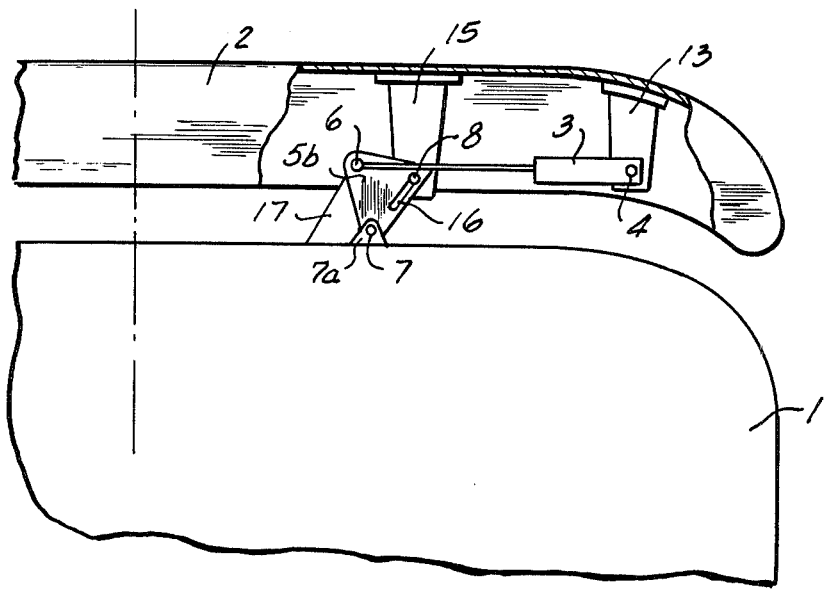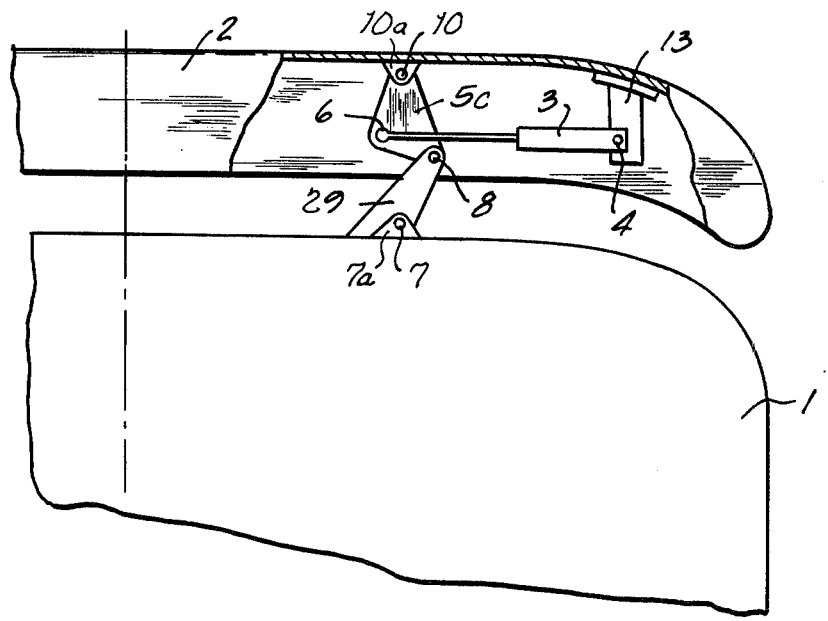

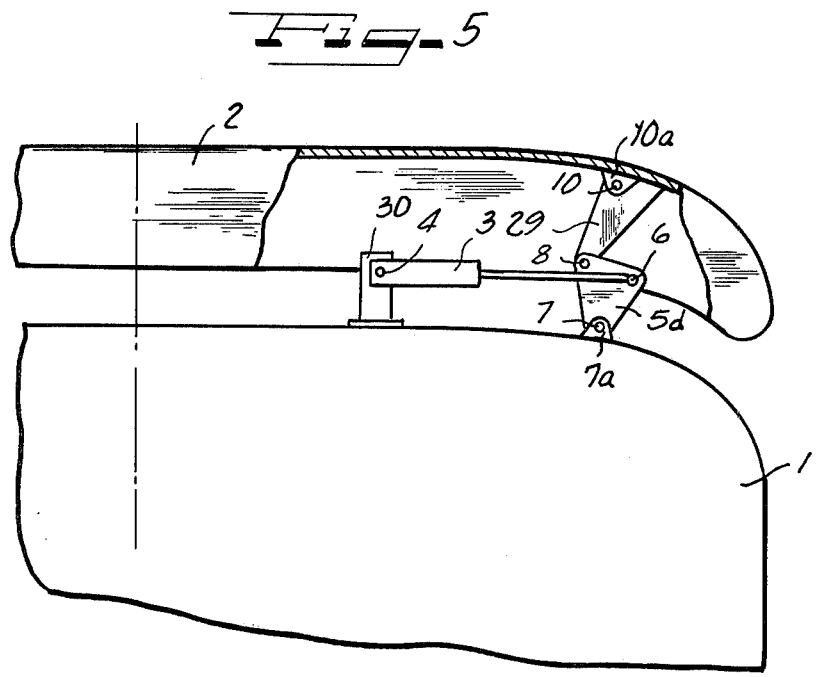
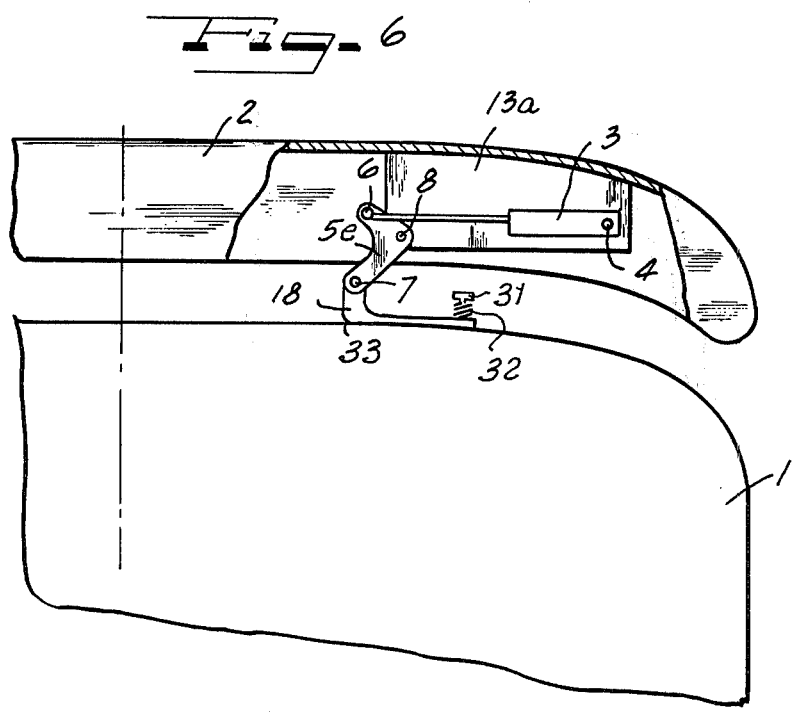

HYDRAULIC SHOCK ABSORBING BUMPER MOUNTING ARRANGEMENT

BRIEF SUMMARY OF THE INVENTION

The prior art includes bumper mounting arrangements embodying two or more shock absorbers positioned between the bumper and the vehicle with the shock absorber extending substantially parallel to the longitudinal axis of the vehicle. The prior art also included shock absorbers positioned obliquely in relation to the longitudinal axis of the vehicle. For example DOS No. 1.933.852 discloses an embodiment which uses four shock absorbers per bumper arranged approximately 45° to the longitudinal axis of the vehicle. These prior art disclosures utilize an objectionable amount of space for the means connecting the bumper to the vehicle and in most instances require objectionably expensive attachment to the part of the vehicle to which the bumper is connected and in difficult locations on the vehicle. Thus, these prior art mounting arrangements are objectionably expensive in themselves and objectionably expensive to mount on the vehicle and bumper.

The present invention includes a simple and economical mounting arrangement particularly suitable for use in cases where very little space is available between the vehicle and the bumper. The instant invention also eliminates mounting any portion of the device into the vehicle itself, thereby avoiding costly mounting means expensive to connect with the vehicle and which might lead to costly alteration of the vehicle body or chassis frame. In some cases very limited space is available due to the desire to keep the total length of the vehicle within certain limits. The instant invention accomplishes this in its preferred form with only one lug or bracket welded or equivalently secured to the vehicle and in another form of the invention two lugs or brackets may be carried by the vehicle, and these brackets are disposed at the most forward portion of the vehicle body frame or chassis frame, easy to locate without any variation in those frames. The invention includes a main pivot element, stopped from pivoting in one direction by stop means, and cushioned in its pivoting in the opposite direction upon occurrence of an impact against the bumper. The main pivot element of the assembly in the event two connected pivotal elements are utilized is connected to one end of a telescopic hydraulic shock absorber which cushions pivotal motion of the main pivot element when there is a collision or other impact on the bumper. Much of the mounting arrangement may be concealed within the channel shaped bumper. A similar mounting assembly is utilized at each end portion of the bumper and each shock absorber is disposed horizontally at right angles to the longitudinal axis of the vehicle and in the limited space between the bumper member and the vehicle member.

BRIEF DESCRIPTION OF THE DRAWINGS

FIG. 1 is a fragmentary rather diagrammatic embodiment of the invention, with parts broken away for clarity, in operatively neutral position at one end portion of the bumper, it being understood that there is a similar device at the opposite end of the bumper;

FIG. 1a is a greatly enlarged fragmentary sectional view of the shock absorber generally indicated by numeral 3 in all the other figures;

FIG. 2 is a diagrammatic view similar in character to FIG. 1 but showing a different embodiment of the instant invention in operatively neutral position;

FIG. 3 is a view similar in character to FIG. 1 showing still another embodiment of the instant invention;

FIG. 4 is a figure similar in character to FIG. 1 illustrating a further embodiment of the invention;

FIG. 5 is also a view similar in character to FIG. 1 illustrating another embodiment of the invention; and FIG. 6 is a view similar in character to FIG. 1 but showing a still different embodiment of the invention.

DETAILED DESCRIPTION

In FIG. 1, as well as FIGS. 2 through 6 a mounting assembly embodying principles of the instant invention is shown disposed between a vehicle member generally indicated by numeral 1 and a channel-shaped bumper member 2, which bumper is in closely spaced association with the vehicle to keep the total length of the vehicle within certain limits. The mounting assembly is illustrated as disposed between the vehicle and the right hand end portion of the bumper, it being understood that a similar mounting assembly is disposed at the left end portion of the bumper allochirally to the arrangement illustrated. A shock absorber, generally indicated by numeral 3 is pivoted by means of a pivot pin 4 to a bracket 13 welded or equivalently secured in this instance to the inside of the channel of the bumper 2.

The shock absorber 3 is a telescopic hydraulic shock absorber and by way of example and not by way of limitation, a satisfactory form of such shock absorber is shown in section in FIG. 1a. From this showing it will be seen that the shock absorber includes a cylinder 20 closed at the end adjacent the pivot pin 4 and also closed at the other end as indicated at 21 except for an aperture for a piston rod 22 to pass therethrough. The piston rod is connected to a piston 23 having a pair of apertures 24 therein through which a hydraulic fluid 25 may pass to the opposite end of the piston when the shock absorber is compressed. A spring 26 bearing against the base of the cylinder 20 and connected to the piston 24 aids in cushioning an impact and also in restoring the bumper and shock absorber to its original position after an impact has occurred. Preferably, the piston rod is enclosed in a shroud 27 (as is conventional) telescopically associated with the cylinder 20 and to which the outer end of the piston rod 22 is connected, the shroud not being shown in any of the other figures for purposes of clarity. The shroud, of course, is to maintain the piston rod in clean condition. An eye 28 provides an aperture for pivot pin 6 at the end of the shroud which pivot pin 6 in effect is connected to the outer end of the piston rod 22.

Again referring to FIG. 1, it will be seen that the mounting assembly includes a main pivot element 5, approximately square in shape, and the aforesaid pivot pin 6 connected to the outer end of the piston rod 22 of the shock absorber passes through a corner portion of the pivot element 5. This element 5 by means of a pivot pin 7 is pivotally connected to a channel shaped bracket 7a or the equivalent secured to the vehicle 1 on the outer face of the part to which the bumper is to be connected. At the opposite outer corner of the pivot element 5 a pivot pin 8 connects to the pivot element 5 a means establishing a pivotal connection between the pivot element and the bracket 10a and comprising an arm 9. The arm 9 is pivotally connected by a pin 10 to the bracket 10a secured to the inside of the bumper, the bracket 10a being similar to the bracket 7a aforesaid. At least portions of the brackets 7a and 10a are in spaced general alignment opposite each other in generally the direction of the longitudinal axis of the vehicle. The three pivotal connections to the element 5 are spaced at the apices of an imaginary triangle. It will be noted that the pivot element 5 can only pivot clockwise as viewed in FIG. 1, but it is prevented from pivoting counter-clockwise by the corner 11 of the pivot element contacting the adjacent part of the vehicle member. The mounting assembly is shown in neutral or inactive position, with the shock absorber piston rod fully extended holding the point 11 in contact with the vehicle. The shock absorber is disposed laterally normal to the longitudinal axis of the vehicle and with the extended end of the piston rod in the limited space between the bumper and vehicle members and offset toward the bumper member 2 from the bracket 7a mounted on the vehicle member 1.

The force of a direct frontal impact against the bumper will be transferred through the arm 9 to the pivot element 5 and tend to pivot it in a clockwise direction, which movement will be resisted by the shock absorber 3. Thus, the cushioning effect of the shock absorber will be maintained to a substantial degree and be effective by compression of the shock absorber during all of the movement of the bumper 2 toward the vehicle 1. When the force of the impact has ceased, the spring in the shock absorber will urge it from compressed condition to extended position at the same time restoring the bumper to its original position if the impact force has not been disastrous. Likewise, the bumper mounting arrangement will cushion a direct transverse impact against the end of the bumper as well as a diagonal impact against the bumper, since both such impacts have a transverse force component, and while the pivot element 5 may pivot slightly upon a diagonal impact, it cannot pivot on a directly transverse or endwise impact from the right end as is viewed in FIG. 1, but the shock absorber will cushion either such impact, likely assisted by the mounting assembly at the opposite end portion of the bumper.

In the embodiment of the invention shown in FIG. 2, the arm 9, pivot point 10, and bracket 10a secured to the bumper in the embodiment of FIG. 1 have been eliminated. However, a pivot element 5a similar to the pivot element 5 of the FIG. 1 is retained and the pivot pin 8 is retained. In this instance, elongated bracket 13a attached to the bumper and provided with a transverse slot 14 therein and the pivot pin 8 in the pivot element 5a rides in this slot upon impact against the bumper. The displacement of the pivot pin 8 in the slot 14 makes it possible for the shock absorber to cushion the impact or impacts as explained above in connection with FIG. 1.

It will be noted that in connection with both FIGS. 1 and 2, only a channel shaped bracket 7a is attached to the vehicle in the whole mounting assembly for the bumper. The bracket may easily be attached at the easiest point to reach on the vehicle, so that the bumper is readily attached with the instant mounting means, namely two brackets 7a even after the vehicle has been otherwise completed.

In the embodiment of FIG. 3, a bracket 15, spaced inwardly from the bracket 13 of FIG. 1, is securely affixed to the inside of the bumper 2. The main pivot element 5b is of triangular shape and the piston rod of the shock absorber is pivoted at 6 in one apical portion, another apical portion is pivoted to the bracket 7a on the vehicle by the pivot pin 7 and the pivot pin 8 carried by the bracket 15 is slidable in a slot 16 in the pivot member 5b. Also, the pivot element 5b carries a depending member 17 from one side thereof which contacts the vehicle adjacent the bracket 7a and prevents pivotal movement of the element 5b in a counter-clockwise direction. Upon impact tending to move the bumper toward the vehicle, pivot element 5b may pivot slightly in a clockwise direction with the pivot pin 8 sliding in the slot 16, but that action will be counteracted and cushioned by the shock absorber as explained above in connection with FIG. 2 whether the impact is directly frontal, diagonal, or lateral.

In the embodiment of FIG. 4, the main pivot element 5c is also triangular, one apical portion thereof being pivotally connected to the bracket 10a and the pivot pin 10 connected on the bumper as mentioned in connection with FIG. 1. The shock absorber is pivoted by the pin 4 to the bracket 13 and the pivot rod of the shock absorber is pivoted to the intermediate apical portion of the pivot element 5c. An arm 29 pivoted by the pin 7 to the bracket 7a on the vehicle is also pivoted by the pin 8 to the other apical portion of the pivot element 5c. This arm 29 is arranged to contact the vehicle inside the bracket 7a with the parts in neutral or stationary position as seen in FIG. 4 with a portion of the arm 29 contacting the vehicle adjacent the bracket 7a. With this arrangement pivotal movement of the element 5c in a clockwise direction is prevented by the arm 29 contacting the vehicle but permits a counter-clockwise pivotal movement of the element 5c upon an impact against the bumper tending to move the same toward the vehicle. This pivotal movement is cushioned by the shock absorber 3 which functions to cushion an impact against the bumper in any direction as discussed above.

Here again, the only thing that need be attached to the vehicle, in FIGS. 3 and 4 is the bracket 7a located in the most accessible location on the vehicle, and there will be another such bracket adjacent the mounting arrangement at the opposite end portion of the bumper.

In FIG. 5, the shock absorber is shown in reverse position and mounted on the vehicle pivot pin 4 of the shock absorber extending through an upstanding bracket 30 welded or equivalently secured to the vehicle, and the channel bracket 7a has been moved to the right from its former position on the vehicle and the channel bracket 10a seen in FIGS. 1 and 4 has also been moved to the right as viewed in FIG. 5. An arm 29 is pivoted by the pin 10 and the bracket 10a on the bumper in such a manner that one end of the arm contacts the bumper when the parts are in neutral position. In this instance, the main pivot element 5d can only pivot counter-clockwise because any movement clockwise would be stopped by the arm 29 contacting the bumper. Upon impact in any direction against the bumper, moving it toward the vehicle the pivot element 5d will pivot counter-clockwise which is counteracted and cushioned by the shock absorber 3.

FIG. 6 also shows an embodiment which includes the wide bracket 13a secured to the bumper as seen in FIG. 2. The shock absorber 3 is pivoted to this wide bracket in the manner seen in FIG. 2 and the bumper connected with one end portion of the crescent shaped pivot element 5e by the pivot pin 6; the pivot pin 8 passing through the bracket 13a as well as the element 5e at the intermediate portion of the element 5e, and the pivot point 7 at the inner end of the pivot element 5e pivotally connects it at that point to the short outwardly extending end of an L shaped bracket 18. The longer leg of the L shaped bracket 18 is connected at the outermost end thereof to the vehicle 1 by a bolt 31 carrying a spring 32, thus providing an elastic or yieldable connection. Upon an impact against the bumper, the main pivot element 5e will pivot clockwise as the bumper moves toward the vehicle, thus causing a lateral movement of the pivot pin 7 and tilt the L shaped bracket 18 around its point of bend 33 and the outermost end of the bracket will move upwardly against the action of the spring 32 thus aiding the shock absorber in reducing the force of the impact, and in restoring the parts to initial position.

Since much of the invention in any of its embodiments may be partly mounted inside the bumper which, stated above, has a channel shaped cross section, and since the end portions of the bumper turn inwardly toward the vehicle the mechanism will be visible only to a small degree, or not at all from above to the casual observer. The mounting means for the bumper are all adapted to be located in limited space between the inner face of the bumper and the outer end of the vehicle which faces the bumper so that the bumper may be mounted closer to the vehicle than has been accomplished heretofore, thus maintaining the vehicle length within a total shorter length if such is desired. Also, it will be noted that the instant bumper mounting assembly may be attached to points of attachment for non-cushioning bumper arrangements by merely welding one or two channel brackets to the outside edges of those points of attachment. There is no necessity of going into deeper points of attachment for the bumper or altering such points of attachment in any way to properly mount the instant invention.

While the parts are shown in rather diagrammatic form in the drawings, it will be understood that all parts are sized to properly cushion impacts against the bumper.

I claim as my invention:

1. A mounting assembly for connecting an end portion of a channel-shaped bumper member in limited spaced relation to a vehicle member and adapted for cushioning impacts against the bumper member, said assembly including a telescopic hydraulic shock absorber comprising a cylinder having one attachment end and a piston rod projecting from the opposite end, spring means associated with the shock absorber to restore the shock absorber to uncompressed initial position after compression thereof with the piston rod projecting beyond said opposite end, and wherein the improvements comprise:

a bracket on said vehicle member projecting toward said bumper member;

a bracket on said bumper member projecting toward said vehicle member;

at least portions of the brackets being in spaced general alignment opposite each other in generally the direction of the longitudinal axis of the member;

means pivotally connecting said one end of the shock absorber to one of said members in a fixed position in the space between said members and substantially spaced from said brackets;

said shock absorber in its uncompressed condition and in the neutral condition of the mounting assembly being disposed on an axis extending transversely and normal to the longitudinal axis of the vehicle member and with the extended end of the piston rod disposed in said space between the members and offset toward the bumper member from said bracket mounted on the vehicle member;

a main pivot element located in said space between the members and pivotally connected at one point thereof to one of said brackets;

means establishing a pivotal connection between said pivot element and the other said bracket at another point on said pivot element;

means pivotally connecting said extended end of said piston rod to a third point on said pivot element;

means associated with said pivot element to prevent pivotal movement thereof in one direction from neutral position;

said means pivotally connecting said piston rod to said pivot member being positioned to resist pivotal movement of the pivot element caused by impact on said bumper member and thereby to effect cushioning of the force of said impact by operation of said shock absorber;

and most of said assembly including at least a substantial portion of said pivot member and a substantial portion of said shock absorber being concealed in the channel of said bumper member whereby the overall length of the vehicle including the bumper member is adapted to be maintained within narrow limits.

2. The assembly of claim 1, wherein the shock absorber is disposed entirely inside the channel of the bumper.

3. The assembly of claim 1, wherein the shock absorber is disposed on the front of the vehicle and is partially concealed by the bumper.

4. The assembly of claim 1, wherein only said bracket on the vehicle connects the entire assembly of said one end portion of the bumper to the vehicle.

5. The assembly of claim 1, wherein the main pivot element is pivotally connected to the bracket on the vehicle member, and a part thereof abuts the vehicle adjacent this bracket to prevent pivoting of the pivot element in said one direction.

6. The assembly of claim 1, including a number carried by the main pivot element to abut the one of said members adjacent the bracket thereon to which the pivot element is connected and prevent pivotal movement of the pivot element in said one direction.

7. The assembly of claim 1, including an arm pivotally connected to the main pivot element at one point and to the other bracket, and said arm contacting the member carrying the bracket to which the arm is pivoted to prevent movement of the pivot element on said one direction.

8. The assembly of claim 1, wherein the bracket on the vehicle is L-shaped, the main pivot element being connected to the shorter leg of the L-shaped bracket, the longer leg of said L-shaped bracket being attached to the vehicle by a bolt, and a spring around the shank of said bolt, whereby said bracket is tiltable against the action of said spring about a fulcrum provided by the bend connecting the legs of the bracket.

9. A mounting assembly for connecting an end portion of a channel-shaped bumper member in limited spaced relation to a vehicle member and adapted for cushioning impacts against the bumper member, said assembly including a telescopic hydraulic shock absorber comprising a cylinder having one attachment end and a piston rod projecting from the opposite end, spring means associated with the shock absorber to restore the shock absorber to uncompressed initial position after compression thereof with the piston rod projecting beyond said opposite end, and wherein the improvements comprise:

- means pivotally connecting one end of the shock absorber to one of said members;
- said shock absorber being disposed transversely and normal to the longitudinal axis of the vehicle when in uncompressed condition;
- separate brackets one of which is mounted on one of said members and the other of which is mounted on the other of said members;
- a main pivot element pivotally connected at one point thereof to one of said brackets;
- means establishing a pivotal connection between said pivot element and the other of said brackets at another point on said pivot element;
- means pivotally connecting said extended end of piston rod to a third point on said pivot element;
- means associated with said pivot element to prevvent pivotal movement thereof in one direction from neutral position;
- said means pivotally connecting said piston rod to said pivot element being positioned to resist pivotal movement of the pivot element caused by impact on said bumper member and thereby to effect cushioning of the force of such impact by operation of said shock absorber;
- the bracket on the vehicle being L-shaped and said main pivot element being connected to the shorter leg of the L-shaped bracket;
- the longer leg of said L-shaped bracket being attached to the vehicle by a bolt;
- and a spring around the shank of said bolt, whereby said bracket is tiltable against the action of said spring about a fulcrum provided by the bend connecting the legs of the bracket;
- and most of the assembly being concealed in the channel of said bumper member whereby the overall length of the vehicle including the bumper member is adapted to be maintained within narrow limits.

* * * * *